A. G. POULLAIN & D. H. J. CORNET.
OPTICAL LENS.
APPLICATION FILED JULY 18, 1911.
1,143,316.   Patented June 15, 1915.
3 SHEETS—SHEET 1.
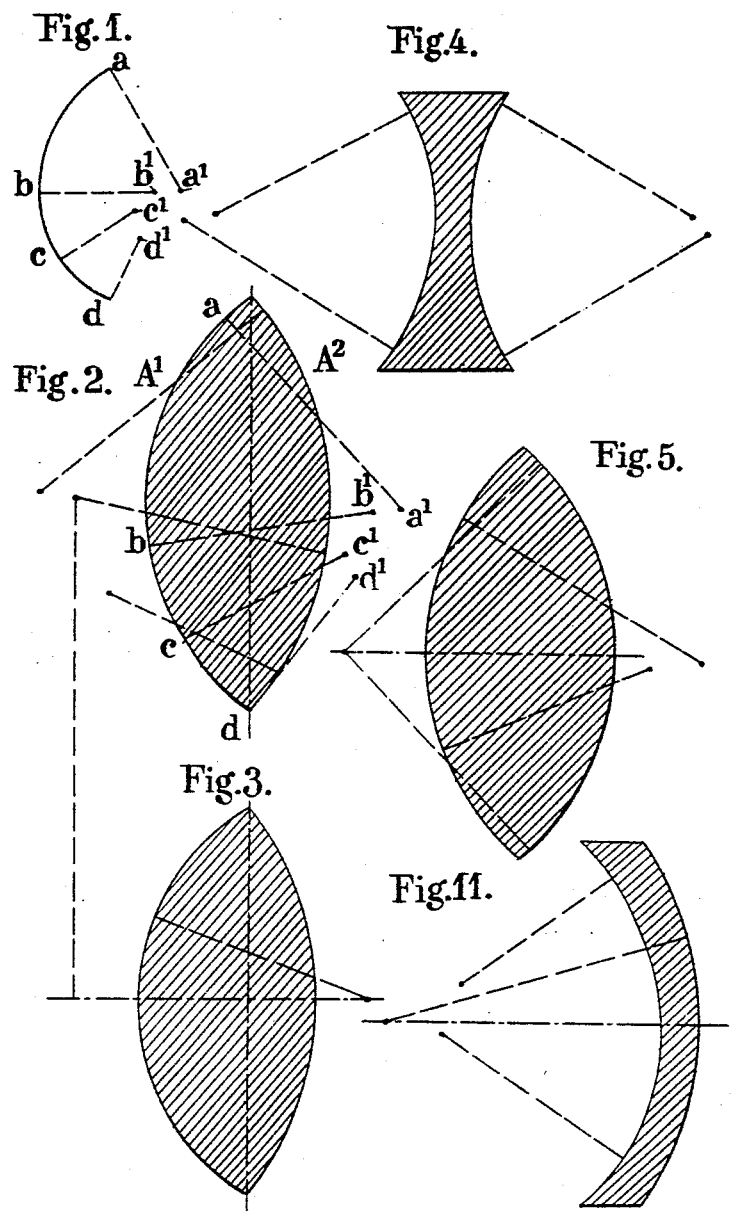

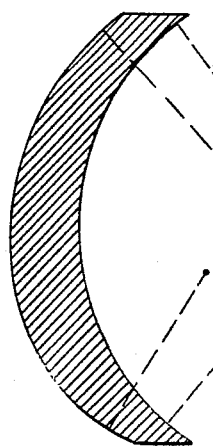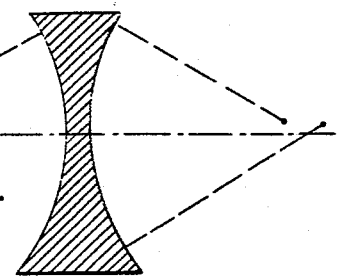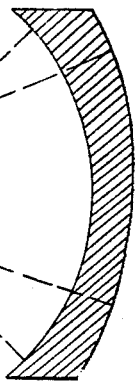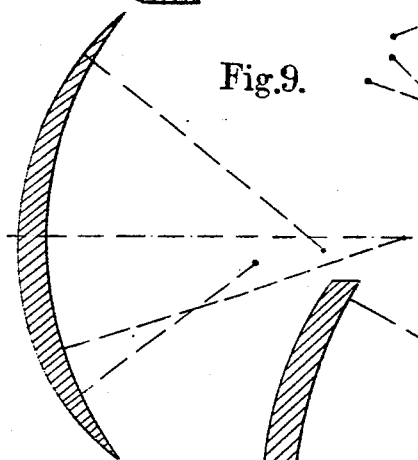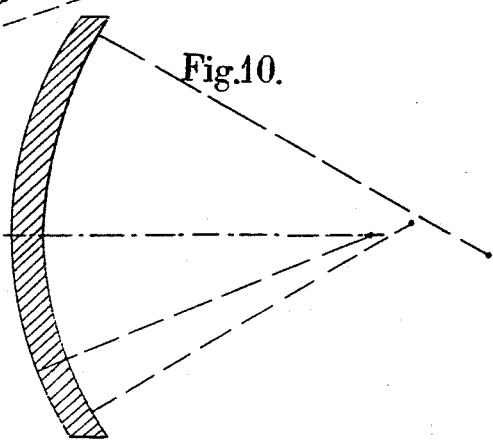

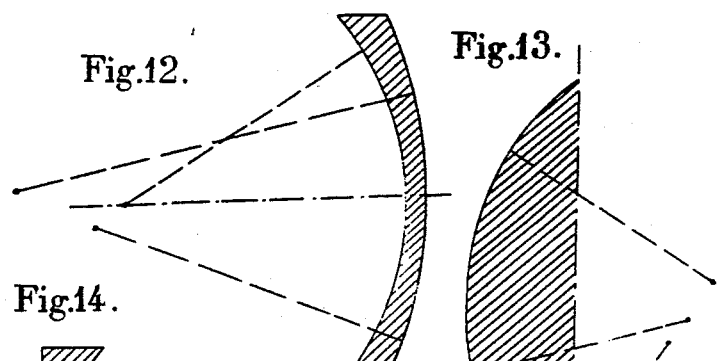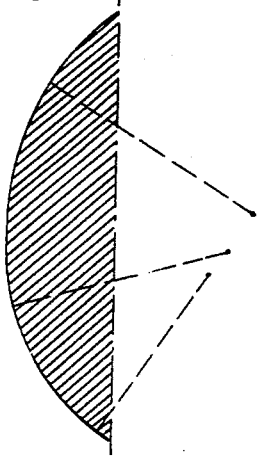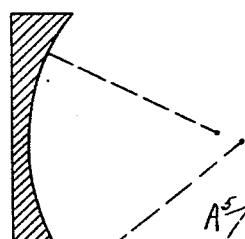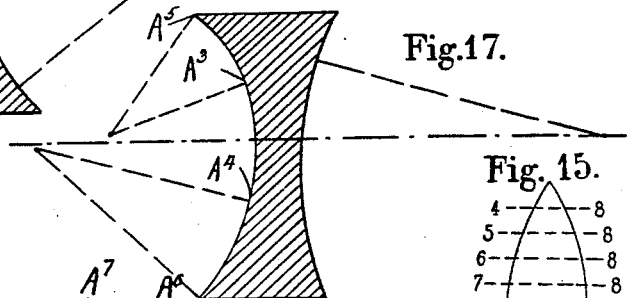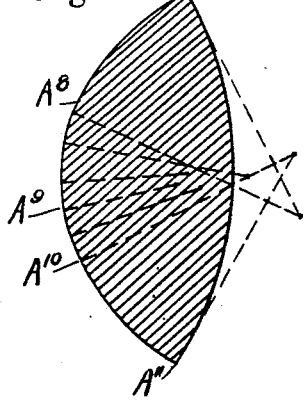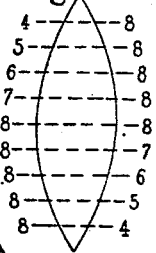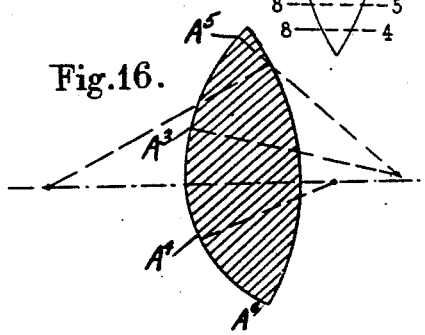

UNITED STATES PATENT OFFICE.

AUGUSTIN GEORGES POULLAIN AND DARIUS HENRI JULIEN CORNET, OF PARIS, FRANCE.

OPTICAL LENS.

1,143,316.      Specification of Letters Patent.     Patented June 15, 1915.

Application filed July 18, 1911. Serial No. 639,091.

*To all whom it may concern:*

Be it known that we, AUGUSTIN GEORGES POULLAIN, of 44 Rue de Eurbigo, landlord, and DARIUS HENRI JULIEN CORNET, of 66 Rue de Rennes, optician, both in the city of Paris, Republic of France, have invented Improvements in and Relating to Optical Lenses, of which the following is a full, clear, and exact description.

The lenses employed in optics to enable long-sighted, very long-sighted or short-sighted people and also those who have been operated on for cataract to see far and near and known by the names of Franklin lenses, double focus lenses, whether in a single piece or assembled, present the inconvenience that they only give distinct vision for given distances corresponding to the focal lengths of the upper part and the lower part of the lens but not giving distinct images to the eye for intermediate distances. Furthermore there is a line of demarcation between the two portions of the lens which is liable to produce diplopia and the eye is subjected to a certain amount of strain when it looks over this line.

The present invention has for its object a form of lens remedying these defects and allowing by its special constitution to see not only near and far but also at intermediate distances.

This lens is essentially characterized by this fact that it presents on one of its faces, or on both, surfaces with radii of variable curvature uniformly progressive; these surfaces can be combined with surfaces of the same kind or with other surfaces of constant radii of curvature, they can also be joined with each other or with surfaces of constant radii of curvature.

The accompanying drawings show, by way of example, the present form of lens and means for the practical realization of its surfaces with progressive radii of curvature.

Figure 1 shows a spiral with radii of curvature varying in a continuous manner, this spiral showing at a greater scale the main section of one of the faces of the present form of lens; Fig. 2 shows the main section of a lens made according to the present invention; Fig. 3 is a section made according to line $b$—$b'$ of Fig. 2. Figs. 4 to 18 illustrate modifications in the manufacture of the present form of lens.

This form of lens is based, as mentioned above, upon the employment of surfaces with radii of variable curvature uniformly progressive in a continuous manner either as regards one or both the faces of the lens. Considering such a lens arranged before the eye and sectioned by a plane perpendicular to the line of the eyes (that is to say the plane of the picture in Fig. 1) and passing through the center of the pupil, this section will be designated the principal section. One at least of the faces of the lens will give as intersection with this plane instead of a circular curve or a succession of circular curves limited in number as in the single, double or triple focus lenses referred to above, a curve with variable radii of curvature uniformly progressive in a continuous manner such as a spiral $a\ b\ c\ d$— for example the radii of curvature $a\ a^1\ b\ b^1\ c\ c^1\ d\ d^1$ of which vary in a continuous manner.

If we consider a second section of the lens on a plane passing through a section $c\ c^1$ normal to this curve at any of its points $c$ and perpendicular to the plane of the principal section the same face of the lens will give as intersection with this plane, either a circular curve of radius equal or unequal to the radius of curvature of the principal section at this point or even a straight line (this is the case of cylinders, the generating lines of which are perpendicular to the principal section). The second face of the lens will be a surface of the same kind as the first or a sphere, a plane, a cylinder, a torus.

Example: Given the problem of correcting a slight requiring $N_e$ diopters for seeing at a distance and $N_p$ diopters for near vision without correction of astigmatism. The principal section of the first face $A^1$ (Fig. 2) of the lens will be a curve with variable radii of curvature uniformly progressive in a continuous manner and determined in accordance with the index of refraction of the material employed in such a manner that they give a refringence of $n_e$ diopters in the upper part of the lens and $n_p$ in the lower part. For every section perpendicular to the principal section at any one of its points and passing through the normal $c\,c^1$ to this section at this point (Fig. 3), any desired conditions can be imposed for example, that this second section shall be a portion of a circumference with radius equal to the radius of curvature $b\,b^1$ of the principal section at this point $c$.

The second face $A^2$ of the lens may be either a surface of the same kind (Figs. 2 and 4) of $n'_e$ diopters in the upper part of the principal section and $n'_p$ in the lower part $n_p$, $n'_p$, $n_e$, $n'_e$, $N_e$ $N_p$ being selected in such a manner that the following equations are obtained:

$$n_e + n'_e = N_e$$
$$n_p + n'_p = N_p$$

or a sphere of $n'_e$ diopters (Figs. 5 and 6) with the conditions:

$$n_e + n'_e = N_e$$
$$n_p + n'_e = N_p$$

In this manner lenses analogous to ordinary biconvex and biconcave lenses are obtained.

The second surface may also be a surface of the same type as the first and of extreme radii of curvature corresponding to $-n'_e$ and $-n'_p$ (Figs. 7 and 8) with the conditions:

$$n_e - n'_e = N_e$$
$$n_p - n'_p = N_p$$

or a sphere of the curvature of $-n'_e$ diopters (Figs. 9, 10, 11, 12) with the conditions:

$$n_e - n'_e = N_e$$
$$n_p - n'_e = N_p$$

and in this manner lenses analogous to convergent or divergent minisci are obtained.

A plane (Figs. 13, 14) might also be taken as the second surface with the conditions:

$$n_e = N_e$$
$$n_p = N_p$$

which would give lenses analogous to ordinary plano-convex and plano-concave lenses.

In cases where it is at the same time desired to correct astigmatism the second surface may be a cylinder or a torus. The cylinders of the tori may have as their principal section a circumference or a curve with variable radii of curvature which will give lenses analogous to sphero-cylindrical and toric lenses. It is also possible to combine two cylinders or a cylinder and a torus or two tori, one or both of them presenting principal sections of variable radii of curvature by inclining the axes one to the other in order to obtain lenses analogous to those termed Chamblant lenses.

The curvers of uniformly progressive curvature employed for the principal section may be either spirals (archimodian, logarithmic, multiple center, circular evolvent spirals, and so forth), arcs of ellipse, parabola, hyperbola curves of the second degree or of higher degrees, algebraic or transcendent, symmetric or nonsymmetric curves.

The present form of lens can be combined in such a manner that its lowest part enables the person who wears the same to see the ground at its feet without being compelled to lower the head in a very sensible way. In this case, the principal section of this type of lens may be constituted by a curve such that in the downward direction the radius of curvature diminishes to a minimum and then increases progressively, or vice versa. This result may be obtained either by choosing the law of variation of this radius of curvature in such a manner that the increase of this radius is first of all negative and then becomes positive or by taking a curve which is symmetrical relatively to an axes or by taking a non-symmetrical curve and joining it with another curve and proceeding in such a manner that at their point of connection the two curves have the same tangent and the same radius of curvature.

In accordance with special forms of vision the lens will present on one of its faces a surface having as its principal section the system of curve defined above and on the other face either a surface of the same kind or a spherical cylindrical, toric, conical or other surface. The principal section of the lens may also be constituted by two curves each composed of a portion in which the radius of curvature increases or decreases and of a portion in which the radius of curvature remains constant, these two curves being arranged opposite each other in such a manner that the portion with an increasing or decreasing radius of curvature of each of these curves corresponds to the portion with constant radius of curvature of the other curve.

Fig. 15 illustrates a method of obtaining a lens of this kind, intended for a person having undergone an operation for cataract requiring 16 diopters for near vision and 12 diopters for distant vision. In the principal section represented in this figure the front face comprises: (a) An upper half the radius of curvature of which decreases progressively from the upper extremity to the median part, its different points corresponding to 4, 5, 6, 7 and 8 diopters. (b) A lower half the radius of curvature of which is constant and correspond to the value of 8 diopters. The rear face of the lens is constituted by a similar but inverted curve in such a manner that the half of each face with decreasing radius of curvature is opposite the portion with constant radius of curvature of the other face.

Considering the different levels of the principal section in the downward direction the following results are obtained:

At the upper part:

$$4^d + 8^d = 12^d$$

Then:

$$5^d + 8^d = 13^d$$
$$6^d + 8^d = 14^d$$
$$7^d + 8^d = 15^d$$

In the median part:

$$8^d + 8^d = 16^d$$

Then below:

$$8^d + 7^d = 15^d$$
$$8^d + 6^d = 14^d$$
$$8^d + 5^d = 13^d$$

At the lower part:

$$8^d + 4^d = 12^d$$

Figs. 16 and 17 show two other methods of obtaining the present lens for long-sighted and short-sighted persons; in each of these lenses the central part alone $A^3 A^4$ is of varying radius of curvature, the upper part $A^5 A^3$ and lower parts $A^4 A^6$ are spherical and their radii are respectively equal to the radii of curvature of the extreme points $A^3 A^4$ of the central part with which these spheres are thus connected without any line of demarcation.

Fig. 18 shows a lens more particularly intended for persons who have been operated on for cataract. This lens comprises:—At its upper part, a surface $A^7 A^8$ of constant radius allowing to see far,—above the latter a surface $A^8 A^9$ with variable radii of curvature progressively decreasing, allowing to see at intermediate distances, the part $A^9$ allowing to see near,—this surface is prolonged with a surface $A^9 A^{10}$ with radii of curvature progressively increasing and enabling to see at intermediate distance toward the ground;—this surface can be prolonged with another surface $A^{10} A^{11}$ of constant radius allowing the person who wears this lens to see at its feet with a sufficient field of view.

Considering the section defined in the lens by a plane perpendicular to the principal section defined above passing through a point of the curve of the latter and by the normal to this curve at this point this section will be a portion of a circumference of a radius equal or unequal to the radius of curvature of the principal section at this point; by giving these two radii suitably selected unequal values the correction of astigmatism can be introduced.

In cases where the two faces of the lens are constituted by fragments of cylinders, the axes of which intersect while the principal sections are curves of the kind indicated above either symmetrical or unsymmetrical astigmatism can be corrected in inclining the axes of the two cylindrical surfaces one to the other not exactly at right angles as in the Chamblant lenses but at an angle which must be determined in accordance with the defect to be corrected.

In order to obtain the surfaces indicated above, the methods ordinarily employed by opticians for cutting spherical, cylindrical or toric lenses would not be suitable and that it would be necessary to have recourse to special machines.

Claims:

1. A spectacle glass with multiple foci, presenting, on one of its faces, a surface determined: on the one hand by a directrix curve situated in the principal section of this glass, in the direction of its height and such that the radii of curvature of its different points vary progressively in a continuous manner,—and on the other hand by generatrix curves cutting this curve and constituted by circumferential arcs situated in planes perpendicular to the principal section of the glass and normal to the said curve.

2. A spectacle glass with multiple foci, presenting on its two faces, a surface determined: on the one hand by a directrix curve situated in the principal section of this glass, in the direction of its height and such that the radii of curvature of its different points vary progressively in a continuous manner,—and on the other hand by generatrix curves cutting this curve and constituted by circumferential arcs situated in planes perpendicular to the principal section of the glass and normal to the said curve.

3. A spectacle glass with multiple foci, presenting on one of its faces a surface determined,—on the one hand by a directrix curve situated in the principal section of this glass in the direction of its height, and composed of parts such that the radii of curvature at the different points of the said parts vary progressively in a continuous manner and of other parts of constant radius of curvature, and on the other hand by generatrix curves cutting the directrix curve and constituted by circumferential arcs, situated in planes perpendicular to the principal section of the glass and normal to the said curve.

4. A spectacle glass with multiple foci, presenting, on one of its faces, a surface determined: on the one hand by a directrix curve situated in the principal section of this glass, in the direction of its height and such that the radii of curvature of its different points vary progressively in a continuous manner,—and on the other hand by generatrix curves cutting this curve and constituted by circumferential arcs situated in planes perpendicular to the principal section of the glass and normal to the said curve, these generatrix curves having radii of curvature respectively equal to the radii of curvature of the directrix curve at its points of intersection with said generatrix curves.

5. A spectacle glass with multiple foci, presenting on one of its faces, a surface determined: on the one hand by a directrix curve situated in the principal section of this glass, in the direction of its height and such that the radii of curvature of its different points vary progressively in a continuous manner,—and on the other hand by generatrix curves cutting this curve and constituted by circumferential arcs situated in planes perpendicular to the principal section of the glass and normal to the said curve, these generatrix curves having equal radii of curvature.

6. A spectacle glass with multiple foci, presenting, on one of its faces, a surface determined: on the one hand by a directrix curve situated in the principal section of this glass, in the direction of its height and such that the radii of curvature of its different points vary progressively in a continuous manner,—and on the other hand by generatrix curves cutting this curve and constituted by circumferential arcs situated in planes perpendicular to the principal section of the glass and normal to the said curve, these generatrix curves having radii of curvature varying among themselves in a constant manner.

The foregoing specification of our improvements in and relating to optical lenses signed by us this seventh day of July, 1911.

AUGUSTIN GEORGES POULLAIN.
DARIUS HENRI JULIEN CORNET.

Witnesses:
H. C. CONCE,
R. THIRIOT.